US011732410B2

United States Patent
Mupende et al.

(10) Patent No.: US 11,732,410 B2
(45) Date of Patent: Aug. 22, 2023

(54) DEVICE FOR ADJUSTING THE DISCARD STATE DETECTION OF HIGH-STRENGTH FIBER ROPES AND LIFTING GEAR COMPRISING SUCH A DEVICE

(71) Applicant: Liebherr-Components Biberach GmbH, Biberach an der Riss (DE)

(72) Inventors: Ilaka Mupende, Neu-Ulm (DE); Ulrich Hamme, Ehingen (DE); Felix Lukasch, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 145 days.

(21) Appl. No.: 17/133,174

(22) Filed: Dec. 23, 2020

(65) Prior Publication Data

US 2021/0189645 A1 Jun. 24, 2021

Related U.S. Application Data

(63) Continuation of application No. PCT/EP2019/067356, filed on Jun. 28, 2019.

(30) Foreign Application Priority Data

Jun. 28, 2018 (DE) ..................... 10 2018 115 662.6
Aug. 26, 2018 (DE) ..................... 10 2018 123 758.8

(51) Int. Cl.
*D07B 1/14* (2006.01)
*D07B 1/02* (2006.01)
(Continued)

(52) U.S. Cl.
CPC ............. *D07B 1/145* (2013.01); *B66C 15/00* (2013.01); *D07B 1/025* (2013.01); *D07B 1/162* (2013.01);
(Continued)

(58) Field of Classification Search
CPC ........ B66C 15/00; D07B 1/025; D07B 1/145; D07B 2201/102; D07B 2201/209; D07B 2205/2014

See application file for complete search history.

(56) References Cited

U.S. PATENT DOCUMENTS 9,063,008 B2 * 6/2015 Husmann .............. B66B 7/1238
9,063,009 B2 * 6/2015 Husmann ............... D07B 1/145
(Continued)

FOREIGN PATENT DOCUMENTS

CN        1256412      6/2000
CN       106087500     11/2016
(Continued)

OTHER PUBLICATIONS

Machine translation WO2017067651, obtained Dec. 21, 2022 (Year: 2022).*

*Primary Examiner* — Shaun R Hurley
(74) *Attorney, Agent, or Firm* — Levine Bagade Han LLP

(57) ABSTRACT

The present invention generally relates to the detection of the discard state of high-strength fiber ropes. The invention relates to a device for detecting the discard state of high-strength fiber ropes for various operating conditions, wherein a rope core of the fiber rope is sheathed with a rope sheath which is intended to wear more quickly than the rope core, comprising an optical detection device for detecting the rope surface and/or a load spectrum counter for detecting the load cycles to which the fiber rope is subjected, and on the other hand to a lifting gear such as a crane comprising such a device. According to the invention, there is provided a detection device for detecting the light absorption coefficient and/or the degree of reflection of the rope sheath and an adaptation device for adapting the algorithm, by means of which the discard state is determined, in dependence on the
(Continued)

detected light absorption coefficient and/or the detected degree of reflection.

11 Claims, 4 Drawing Sheets

(51) Int. Cl.
*B66C 15/00* (2006.01)
*D07B 1/16* (2006.01)

(52) U.S. Cl.
CPC .................. *D07B 2201/102* (2013.01); *D07B 2205/2014* (2013.01)

(56) References Cited

U.S. PATENT DOCUMENTS

| | | | |
|---|---|---|---|
| 9,096,298 B1* | 8/2015 | Alvarez | B63C 9/26 |
| 2003/0052695 A1 | 3/2003 | Smith | |
| 2016/0216183 A1* | 7/2016 | Mupende | B66C 15/00 |
| 2018/0238815 A1* | 8/2018 | Mupende | B66C 15/00 |

FOREIGN PATENT DOCUMENTS

| | | |
|---|---|---|
| DE | 202009014031 | 12/2009 |
| DE | 202011001846 U1 | 4/2012 |
| EP | 3180472 | 6/2017 |
| EP | 3357858 | 8/2018 |
| EP | 3392404 | 10/2018 |
| JP | H07-117989 | 5/1995 |
| WO | WO 2012/010431 | 1/2012 |
| WO | WO 2012/010433 | 1/2012 |
| WO | WO 2014/037350 | 3/2014 |
| WO | WO 2017/067651 | 4/2017 |
| WO | WO 2020/002615 | 1/2020 |

* cited by examiner

DEVICE FOR ADJUSTING THE DISCARD STATE DETECTION OF HIGH-STRENGTH FIBER ROPES AND LIFTING GEAR COMPRISING SUCH A DEVICE

CROSS-REFERENCE TO RELATED APPLICATIONS

This application is a continuation of International Patent Application Number PCT/EP2019/067356 filed Jun. 28, 2019, which claims priority to German Patent Application Numbers DE 10 2018 115 662.6 filed Jun. 28, 2018 and DE 10 2018 123 758.8 filed Sep. 26, 2018, the contents of which are incorporated herein by reference in their entireties.

BACKGROUND

The present invention generally relates to the detection of the discard state of high-strength fiber ropes. The invention on the one hand relates to a device for detecting the discard state of high-strength fiber ropes for various operating conditions, wherein a rope core of the fiber rope is sheathed with a rope sheath which is intended to wear more quickly than the rope core, comprising an optical detection device for detecting the rope surface and/or a load spectrum counter for detecting the load cycles to which the fiber rope is subjected, and on the other hand to a lifting gear in particular in the form of a tower crane or telescopic boom crane comprising such a device for detecting the discard state.

For quite some time now attempts have been made in the lifting technology and in particular in cranes to replace the commonly used heavy steel ropes by high-strength fiber ropes which are made of high-strength synthetic fibers such as for example aramide fibers, aramide/carbon fiber mixtures, highly modular polyethylene fibers (HMPE), liquid crystal polymer (LCP)-Vectran or poly(p-phenylene-2,6-benzobisoxazole) fibers (PBO) or at least include such fibers. Due to the weight saving of up to 80% as compared to steel ropes with approximately the same breaking strength, the lifting capacity or the admissible lifting load can be increased, as the own weight of the rope to be taken into account for the lifting capacity is distinctly lower. Especially in cranes with a large hoisting height, or in booms or mast adjusting mechanisms comprising pulley blocks with a high number of reevings, considerable rope lengths and hence also a corresponding rope weight are obtained, so that the weight reduction that is possible due to high-strength fiber ropes is very advantageous. In addition to the weight advantage of the fiber rope itself, another advantage consists in that the use of fiber ropes also provides for a weight saving in further components. For example, the load hook can be constructed lighter, since less load hook weight is necessary for tensioning a fiber rope. On the other hand, the good flexibility of synthetic fiber ropes allows smaller bending radii and hence smaller pulleys or rollers on the crane, which leads to a further weight reduction in particular in the area of crane booms, so that with large crane outreaches a considerable increase in load moment can be achieved.

In addition to said weight advantages, rope drives comprising synthetic fiber ropes are characterized by a considerably longer service life, easy handling and good flexibility as well as the no longer necessary rope lubrication. In general, a larger machine availability can be achieved thereby.

One difficulty in such high-strength fiber ropes, however, consists in predicting or determining their discard state precisely and reliably. High-strength fiber ropes like steel ropes are wear parts that have to be replaced when their state has deteriorated to such an extent that during the further operation the required safety no longer is given. This state generally is referred to as discard state.

In conventional steel ropes, the discard state can be determined in an actually rather simple way by inspecting the condition of the rope, wherein the procedure for the examination and the extent of examination is specified by the standard ISO 4309. In essence, there is determined the number of wire fractures along a particular measurement length of the rope, a reduction of the rope diameter and strand fractures. This measurement method, however, is not possible for the detection of the discard state of high-strength fiber ropes, as the synthetic fibers used do not show the same behavior as wire strands.

From the document DE 20 2009 014 031 U1 there is known a high-strength fiber rope made of synthetic fibers, in which a rope core is provided with a sheathing which is colored differently than the rope core and in turn itself has various sheath layers of different colors. This different coloration is intended to allow an easier detection of when an abrasion of an outer layer reveals a differently colored underlying layer or even the rope core. In practice, however, this actually expedient color indicator function has the disadvantage that due to the properties of high-strength synthetic fibers, the sheathing tends to fail quite abruptly as a whole so that it is difficult again to be able to determine or predict the discard state of the rope in good time.

Furthermore, it is known from EP 3 180 472 B1 to monitor high-strength fiber ropes by means of a camera and to compare the images of the fiber rope with reference images that are stored in a memory and reveal characteristic damages, in order to determine the current degree of wear and damage of the sheathing by means of the comparison of images and therefrom determine the discard state.

Although the detection of the rope sheath wear per se is reasonable and reliably feasible, it is the problem in practice that a certain rope sheath wear in synthetic fiber ropes does not always correspond with the actual degree of the discard state to the same extent, as the discard state is differently influenced by various operating conditions and a variety of operating parameters, and rope sheath and rope core are not always impaired to the same extent.

In so far, it has already been thought of adapting the rope sheath to various operating conditions by using fibers of different wear strength, a different sheath structure or thickness, and of not solely relying on an optical examination of the rope sheath, but to employ other criteria for the detection of the discard state, cf. e.g. EP 3 392 404 A. However, both of this is not easily possible and involves considerable difficulties and impairments.

On the one hand, the rope sheath regularly is not a pure wear indicator, which would be freely designable and in so far finely adaptable to various conditions of wear, but is an integral part of the rope, which supports and protects the rope core in terms of load-bearing capacity.

In principle, non-sheathed ropes in particular in a braided construction have a low stability, which has a disadvantageous effect in the multilayer spooling on the drum.

The wear of the rope and its sheathing is caused by the rope drive, i.e. by the bending cycles in the course of the rope running over pulleys and the rope friction on the drum on spooling, especially with a multilayer spooling. Reference here is made to a system-related wear.

The wear of the sheathing is influenced by different parameters, e.g.:
- by the thickness of the sheathing,
- by the number of sheath layers 1 to n,
- by different materials of the fibers from sheath layer to sheath layer,
- by the mixture of different fiber materials in each sheath layer, which however are not freely designable due to the further tasks of the sheath,
- by a different constructive design of the sheath layers when using identical fiber materials.

In so far, it has already been attempted to employ further criteria beyond the optical image of the damage of the rope sheathing for assessing or determining the discard state. For example, there have been proposed devices which monitor a reduction of the rope diameter, determine an increase in length of the rope sectionally and on the whole, detect a formation of humps and compare the same with respective limit values. Above all, it has also been proposed already to monitor the admissible load cycles also in dependence on the operating temperature and therefor provide a load spectrum counter. The bending cycles experienced by the fiber rope are counted here, and there has been developed an algorithm which is able to calculate the bending cycles in dependence on the operating and construction data. However, various difficulties also arise when monitoring the load cycles in this way, for example to the effect that the load cycle counter is not able to monitor all of the actually relevant influences on the service life, for example the amount of sand and dust, chemical impact on the rope due to exhaust air clouds and the like, or just very practical imponderables such as non-counted additional load cycles due to the use of the rope on another winch mechanism.

Therefore, it is the object underlying the present invention to create an improved method for adjusting the optical detectability of the discard state of high-strength fiber ropes, an improved device for detecting the discard state of high-strength fiber ropes and an improved set of high-strength fiber ropes with a better detectability of the discard state.

SUMMARY

According to the invention, said object is achieved by a device and a lifting gear.

Hence, it is proposed to design the rope sheath differently in terms of its absorption and/or reflection of sunlight or daylight in order to adjust the wear resistance or wear speed of the rope sheath and adapt it to various operating conditions, and to adapt the mode of operation of an automatic device for determining the discard state in dependence on a detected degree of daylight absorption and/or reflection. The corresponding device for determining the discard state comprises in particular optical detection means, in particular an imaging sensor system for example comprising a camera by means of which images of the high-strength fiber rope can be made and can be compared with reference images that can be stored in a reference memory.

Advantageously, such a device is configured to operate self-adaptively in order to take account of the adjustment of the rope sheath in terms of its degree of light absorption and/or its degree of reflection. In particular, the device can include detection means for detecting and/or determining the light absorption coefficient and/or the degree of reflection of the rope sheath, wherein a presetting means can be provided and can be configured to automatically adapt or change the evaluation algorithm in dependence on the determined light absorption coefficient and/or the determined degree of reflection in order to determine the discard state with reference to the detected rope parameters such as damage pattern by means of the image comparison and/or detected load spectrum and/or detected number of load cycles.

Such an adaptation device makes use of the fact that when determining the rope for more wear-intensive conditions, the rope sheath of the rope is provided with a higher daylight absorption coefficient and/or a lower degree of reflection than when determining the rope for lower-wear operating conditions. Depending on the intended work spectrum, the rope sheath is configured differently as regards its behavior when exposed to sunlight, in order to change the ratio of the wear speed of the rope sheath to the fatigue speed of the rope core and adapt it to the intended work spectrum. Due to a high light absorption coefficient for example as a result of light-absorbing particles in the rope sheath and/or a lower degree of reflection of the rope sheath, for example as a result of few or no light-reflecting particles on the rope sheath, the same heats up relatively strongly when exposed to daylight so that the rope sheath will wear more quickly due to higher operating temperatures. Conversely, increased operating temperatures of the rope sheath and hence increased wear speeds of the rope sheath can be avoided when the rope sheath has a lower daylight absorption coefficient and/or a high degree of reflection.

Due to the adjustment of the wear speed of the rope sheath by varying its light absorption capacity, a rope can be configured for various operating conditions and load spectra without therefor having to change or adapt the essential construction characteristics of the rope construction. In particular, there can be created a rope set which comprises a plurality of high-strength fiber ropes corresponding to each other in terms of rope diameter, maximum lifting capacity and tensile strength of the rope, for example as regards the rope breaking load or maximum strand tensile load, core diameter and sheath thickness, fiber material, number of fiber bundles and strands, and the fiber bundle structure such as braiding pattern, and in so far have mechanical properties comparable with each other. However, the rope sheaths are set differently as regards the light absorption coefficient so that the rope sheath will wear at different rates despite otherwise having the same structure.

This not only allows to reduce and simplify the manufacturing costs and processes, but also to configure the rope sheath as such optimally for its other tasks such as the support and protection of the rope core, contribution to the rope strength, etc. Above all, however, one can rely on the optical detection of the damages occurring at the rope sheath and a determination of the discard state derived therefrom, as the wear speed can be adapted to the respective load spectrum and the respective operating conditions, and the wear of the rope sheath actually correlates with the discard state.

The daylight absorption coefficient can be variably set in different ways. In principle, it would be possible to provide a surface coating of the rope sheath that is variable or different in terms of its degree of reflection and/or its degree of transmission, depending on what wear speed of the rope sheath is required for the respective work spectrum or the respective operating conditions. Depending on how much daylight can penetrate the actual rope sheath through such a surface coating, its wear speed is increased or reduced.

However, to avoid the strong mechanical wear of such a surface coating or to render the same harmless, the absorption coefficient of the rope sheath according to an advantageous development of the invention can be adjusted by coloring fibers and/or fiber bundles of the rope sheath with black and/or white and/or differently colored or differently gray pigments. By means of pigments of different color or brightness, which are embedded in the fibers or fiber bundles and/or between fiber bundles, a permanent setting of the absorption coefficient can be achieved so that the daylight exposure permanently has the same, desired effect on the wear speed of the rope sheath.

In particular, the rope sheath can be formed darker for more wear-intensive operating conditions and/or wear-promoting load spectra and can be formed comparatively brighter for lower-wear operating conditions and/or lower-wear load spectra. Due to a darker sheath configuration, the rope sheath will heat up more strongly in daylight and correspondingly wear more quickly, while a brighter rope sheath experiences less heating and correspondingly will age or wear more slowly.

Alternatively or in addition to the admixture of light-absorbing particles or color pigments, which change the light absorption coefficient, a UV protection agent can also be added to the fibers and/or fiber bundles of the rope sheath to a different extent or in a different concentration in order to increase the UV light resistance of the rope sheath or to reduce the same by less or no admixture, so as to be able to adapt the wear speed of the rope sheath to various load spectra. For heavier load spectra a stronger UV protection and for lighter load spectra a weaker UV protection can be provided, or conversely for heavier load spectra a weaker UV protection and for lighter load spectra a stronger UV protection can be provided, wherein such a UV protection can be effected for example by impregnating the fibers and/or fiber bundles of the rope sheath with a corresponding UV protection agent.

The daylight absorption coefficients of the rope sheaths of a rope set in principle can be spaced at different distances from each other, wherein the light absorption coefficient in principle can vary between 0 and 1, i.e. between no light absorption at all and a maximum light absorption. For a rope that is determined for a heavy load spectrum, in which the expected service life of the rope is 50% or less of the maximum service life with a light load spectrum, said daylight absorption coefficient advantageously can be set at greater than 0.6 or also greater than 0.75, for example in that a corresponding amount of black particles or pigments or other light absorption pigments are embedded in the rope sheath and/or its fibers and/or fiber bundles. On the other hand, when the rope is to be configured for a lightweight load spectrum, the rope sheath can be configured with a light absorption coefficient of 0.4 or less or also 0.3 or less. For medium-weight load spectra, in which the expected service life lies between 40% and 80% or amounts to 50% to 70% of the maximum service life, the light absorption coefficient advantageously can be adjusted to a value between 0.4 and 0.6.

Said maximum service life can be determined empirically and/or mean the service life achieved under very favorable external conditions and low, lightweight load spectra which do not go up to the maximum load-bearing capacity of the rope or only rarely do so. For example, this can be the service life achieved by the rope when it is subjected to a load spectrum which in the Wöhler fatigue test allows the Wöhler fatigue strength to be achieved.

In principle, an adjustment of the wear speed of the rope sheath by varying its light sensitivity allows the discard state to be examined and monitored by optical inspection, for example by the machine operator or a correspondingly trained supervisor.

Advantageously, however, an automated, machine-based monitoring and determination of the discard state can be carried out, wherein the corresponding device for determining the discard state, as already mentioned above, can include in particular optical detection means, in particular an imaging sensor system for example comprising a camera by means of which images of the high-strength fiber rope can be made and can be compared with reference images that can be stored in a reference memory. Alternatively or additionally, the device can however also comprise a load spectrum counter which counts the load cycles to which the high-strength fiber rope is subjected, and thereby possibly detects further, relevant load cycle parameters such as rope speed, rope load and deflection radius, and determines a corresponding load spectrum.

Advantageously, such a device is configured to operate self-adaptively in order to take account of the adjustment of the rope sheath in terms of its degree of light absorption and/or its degree of reflection. In particular, the device can include detection means for detecting and/or determining the light absorption coefficient and/or the degree of reflection of the rope sheath, wherein a presetting means can adapt or change the evaluation algorithm in dependence on the determined light absorption coefficient and/or the determined degree of reflection in order to determine the discard state with reference to the detected rope parameters such as damage pattern by means of the image comparison and/or detected load spectrum and/or detected number of load cycles. For example, the device for determining the discard state can determine the discard state with reference to the detected bending cycles of the rope and the determined damage pattern on the basis of an algorithm which is modified by the presetting device in the way mentioned above.

When said detection device for detecting the degree of light absorption for example detects that a high-strength fiber rope with a dark rope sheath, for example a rope sheath from the darkest category, is used, and/or the detected light absorption coefficient exceeds a predetermined threshold value, the presetting and/or adaptation device can adapt the algorithm to the effect that a discard state signal is output already when lower damage images are detected and/or a lower number of load cycles is reached.

In general, the adaptation device can be configured to set a lower critical number of load cycles on determination of a darker rope sheath (2) and to set a higher critical number of load cycles on determination of a brighter rope sheath (2).

On the other hand, when the detection device detects a smaller light absorption coefficient and/or a higher degree of reflection on the rope used, the algorithm for determining the discard state can be reconfigured or adapted to the effect that a discard state signal is provided only upon reaching a larger number of load cycles and/or upon detection of a damage image with major damages.

Advantageously, the adaptation device is configured to modify the critical number of load cycles, at which a discard state signal is output, in dependence on the detected light absorption coefficient and/or the detected degree of reflection such that at a higher degree of light absorption the critical number of load cycles is set lower than at a comparatively lower light absorption coefficient.

Regardless of the concrete configuration of the adaptation device, the detection device can be configured to detect black and/or white pigments and/or other light absorption pigments with which fibers and/or fiber bundles of the rope sheath are colored, and/or to determine their quantity, and to determine the light absorption coefficient and/or degree of reflection of the rope sheath with reference to the detected black and/or white pigments and/or other light absorption pigments and/or the detected quantity thereof.

In particular, on determination of a light absorption coefficient a >0.6 or a >0.75 for a heavy load spectrum in which the fiber rope has a service life of less than 50% of the maximum service life which the fiber rope has when subjected to a load spectrum leading into the range of the Wöhler fatigue strength, the adaptation device is configured to fix the critical number of load cycles at less than 50% of the number of load cycles at which the fatigue strength range is reached, and on determination of a light absorption coefficient of <0.4 or <0.3 for a lightweight load spectrum, at which the rope has a service life of at least 75% of the maximum service life, to fix the critical number of load cycles at 75% or more of the number of load cycles at which the fatigue strength range is reached.

The lifting gear in which the device can be used in particular can be a crane, for example in the form of a tower crane or a mobile crane such as e.g. a telescopic boom crane, wherein at least one hoisting rope of the crane, on which a load lifting means such as a load hook is mounted, can be formed by the high-strength fiber rope. However, the lifting gear can also be configured in the form of other cranes such as e.g. a harbor crane or a deck crane or in the form of a freight or passenger elevator or other passenger or freight conveyor, such as a cable car or chairlift.

Advantageously, the lifting gear can have a high-strength fiber rope set comprising a plurality of high-strength fiber ropes for various operating conditions of the lifting gear, wherein all of the fiber ropes each have a rope core and a rope sheath which is intended to wear more quickly than the rope core, wherein the fiber ropes furthermore have the same rope diameters, the same rope core diameters, the same sheath thicknesses, the same fiber bundle assemblies, the same fiber materials and the same rope tensile strength, wherein the rope sheaths of the fiber ropes have different daylight absorption coefficients, wherein a fiber rope intended for more wear-intensive operating conditions has a rope sheath with a higher daylight absorption coefficient than a fiber rope intended for lower-wear operating conditions, and wherein the adaptation device is configured to set the critical number of load cycles with reference to the respectively incorporated fiber rope from the set of fiber ropes and with reference to the respectively detected daylight absorption coefficient.

BRIEF DESCRIPTION OF THE DRAWINGS

The invention will be explained in detail below with reference to a preferred exemplary embodiment and associated drawings. In the drawings.

DETAILED DESCRIPTION

Figure 3:
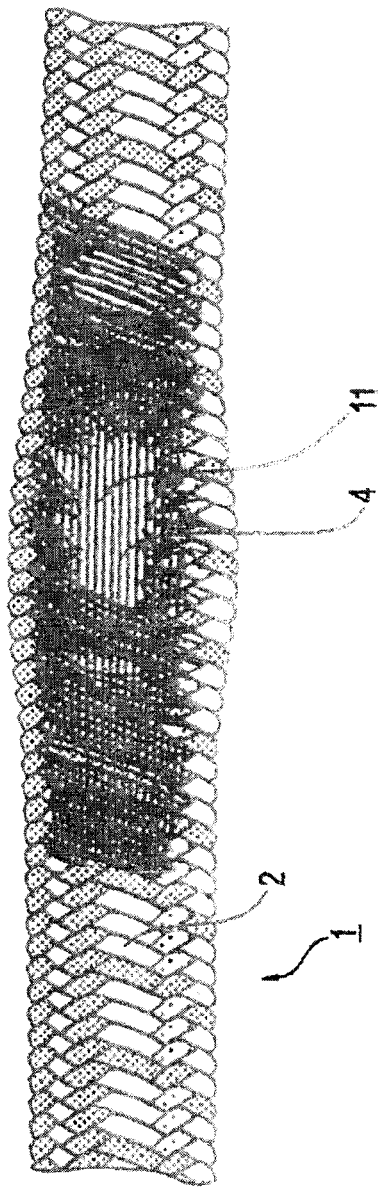

As is shown for example in FIG. 3, the high-strength fiber rope comprises a rope core 11, which can be braided or battered from strands 4, which in turn consist of high-strength synthetic fibers or at least comprise such high-strength synthetic fibers, for example aramide fibers or HPMA fibers, HMPE fibers or others of the above-mentioned types of fiber, wherein said rope core 11 can consist of fibers of one type of fiber or fibers of different types of fiber.

The sheathing 2 surrounds said rope core 11 and can directly sit on said rope core or possibly be spaced apart from the same by an intermediate layer. Said sheathing 2 in particular can form the outer sheath of the rope 1. The rope core 11 can provide the entire indicated load-bearing capacity of the rope 1. The sheathing 2 only additionally has a supporting effect, in particular to protect the rope core 11 and as a wear indicator.

Said sheathing 2 can consist of a single sheath layer or also comprise a plurality of sheath layers arranged one above the other.

As is shown in the Figures, said sheathing 2 can comprise strands 3 which are braided with each other to form the sheathing 2 and can each consist of high-strength synthetic fibers or at least include such high-strength synthetic fibers.

In particular, said strands 3 of the sheathing 2 can be formed of different synthetic fibers of different abrasive and/or tensile strength and/or from different materials.

FIG. 3 shows a sheath wear of the sheathing 2 which for example can be due to the rope drive, in particular the deflection of the rope around the pulley, the bending cycles along the length of the rope, the rope friction on the drum on spooling, and also the load acting with a multilayer spooling on the drum, in which the rope sections of an upper layer threaten to cut in between the rope sections of a lower layer.

Figure 1:
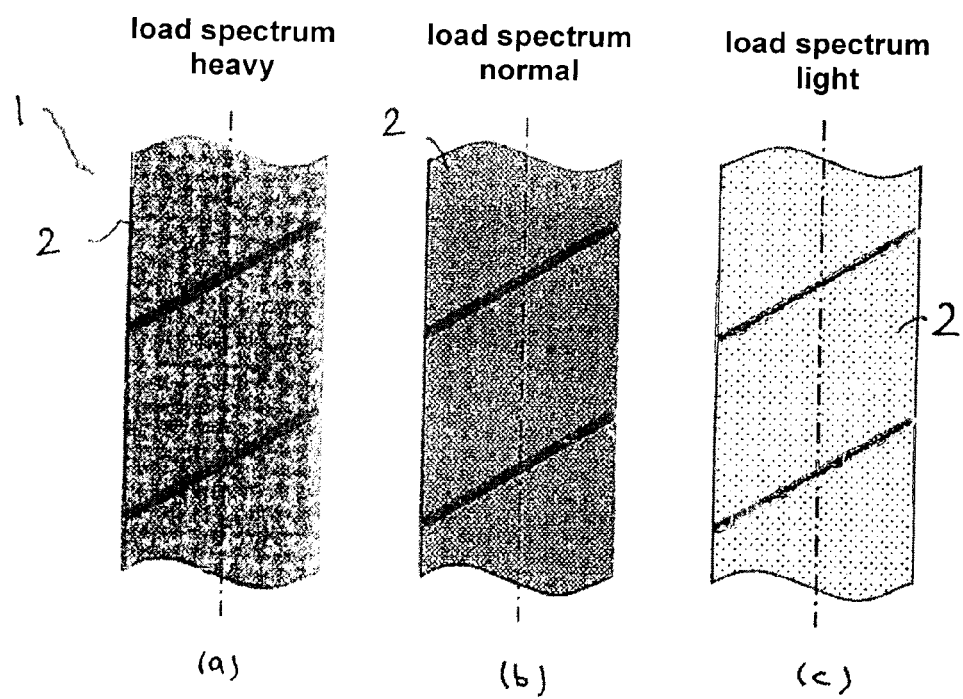
FIG. 1: shows a representation of a rope set comprising three high-strength fiber ropes with different daylight absorption coefficients and degrees of brightness/darkness and different wear speeds implied thereby.

FIG. 1 shows the rope 1 with sheathing 2 and strands 3 of the sheathing in different colors.

Figure 2:
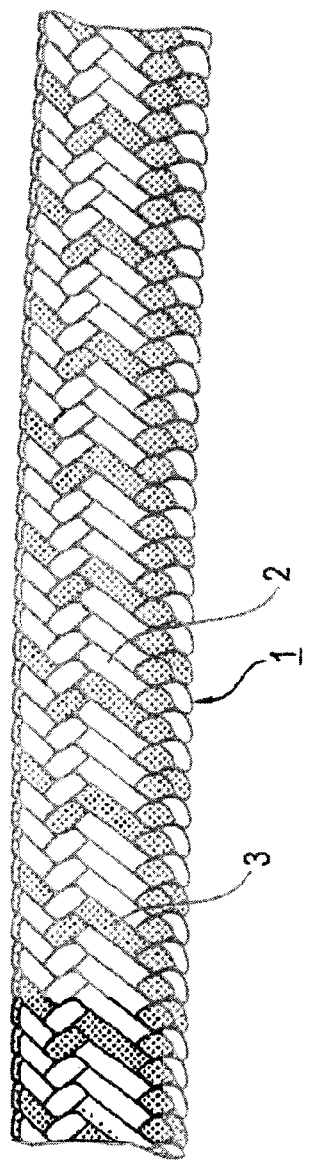
FIG. 2 and FIG. 3: each show a side view of a high-strength fiber rope with a braided sheathing, wherein in FIG. 2 the rope sheath is shown without wear damages and in FIG. 3 with a damage.

FIG. 2 shows the rope 1 with sheathing 2 yet without any visible wear of the individual strands 3 of the sheath. Degree of the shown damage <5%.

FIG. 3 shows the rope 1 whose sheathing is worn over a partial section of about 90°, and the strands 4 of the load-bearing rope become visible. Degree of the shown damage about 50%.

As is shown in FIG. 1, the rope sheaths 2 of different high-strength fiber ropes are colored or formed differently bright in order to realize different light absorption coefficients of the rope sheath. The partial view (a) of FIG. 1 shows a rope sheath colored dark for heavy load spectra, which has a light absorption coefficient greater than 0.8 and for example can be formed with a dark-gray to black color, in that a corresponding amount of black color pigments are incorporated in the fiber bundles or the fibers themselves. Due to the correspondingly strong heating of the rope sheath when exposed to sunlight and a corresponding temperature heating of the rope sheath, the same can be adapted for example to wear after 3 years, in order to indicate the discard state.

The partial view (b) of FIG. 1 shows a rope sheath 2 colored medium-dark or medium-bright of the high-strength fiber rope with a light absorption coefficient of 0.4 to 0.7 and/or a medium-gray color. The high-strength fiber rope with such a medium-bright/medium-dark rope sheath can be used for example for a normal load spectrum and wear with the rope sheath at about 5 years.

The partial view (c) of FIG. 1 finally shows a fiber rope with a bright rope sheath whose light absorption coefficient for example can be less than 0.4. With such a bright rope sheath the sheath wear can start only upon reaching 8 to 9 years or an extent which indicates the discard state. Such a rope can properly be intended for a lightweight load spectrum.

Figure 4:
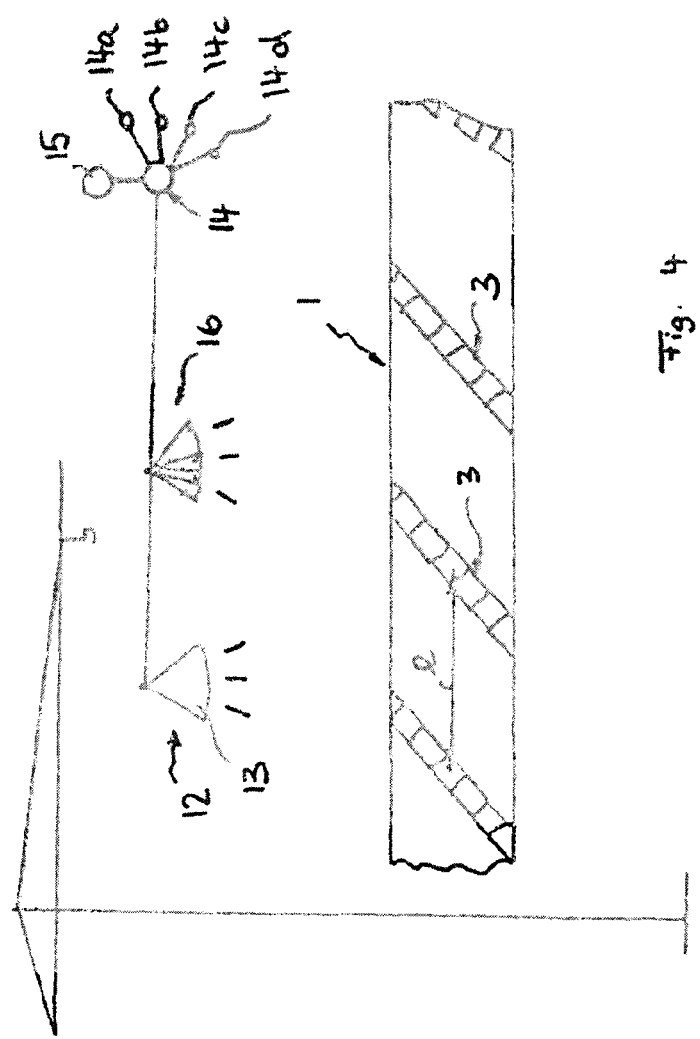
FIG. 4: shows a schematic representation of a device for determining the discard state and its components, which for determining the discard state provide for an optical detection of the rope sheath and for counting the load cycles.

FIG. 4 shows a device for determining the discard state in more detail. In particular, an actual image of the rope can be detected by means of an optical detection device 12, for example a camera 13, which by means of an automatic or semi-automatic evaluation device comprising an image evaluation device 14 is then optically compared with the reference representations stored in a reference image memory 15 in order to detect and categorize damages visible in the actual image.

The evaluation device then can add up the individual damages in the way mentioned above and possibly output a discard state signal. As shown in FIG. 4, said device for detecting the discard state can be integrated into a lifting gear, in particular into a crane 21 and its crane controller.

As is shown in FIG. 4, the image evaluation device 14 can comprise contour evaluation means 14a which can determine rope thickenings due to fanning of the wear sheath and/or thinnings in areas in which the rope sheath 2 is worn and/or missing, and/or other changes in contour such as undulations which occur as compared to the desired state of the rope contour.

Furthermore, the image evaluation device 14 can comprise color pattern evaluation means 14b which by means of an image comparison can determine changes of the color pattern shown by the rope in the recorded image and can therefrom determine the discard state.

Furthermore, said image evaluation device 14 can also comprise evaluation means 14c for evaluating the percentage of colored areas, which in a detected image of the rope 1 can determine the area percentage of a respective color, which is occupied by the color in the total area of the rope 1. For example, when the wear sheath 2 of the rope 1 is striped black-white-gray, wherein the stripe widths are identical so that each color occupies one third of the total area, said evaluation means 14c for evaluating the percentage of colored areas can determine wear of the white fibers or strands and an accompanying damage of the rope 1, when the area percentage of said white fibers or strands decreases from the setpoint value of 33% to for example less than 25% or less than 15%.

Said evaluation means 14c for evaluating the percentage of colored areas can also determine the occurrence of a new color and its area percentage. For example, when the differently colored rope core 11 appears due to the wear of the wear sheath 2, red spots for example can appear in the aforementioned black-white-gray color pattern so that the evaluation means 14c for evaluating the percentage of colored areas can determine a damage when the area percentage of the red spots exceeds a predetermined extent.

In an advantageous development of the invention, the image evaluation device 14 can also comprise elongation evaluation means 14d which can determine an elongation Δl of the high-strength fiber rope 1 and/or its wear sheath 2 with reference to a comparison of the current rope image with a stored reference image. In particular, said elongation evaluation means 14d can identify and determine the spacing 1 of predetermined color pattern and/or pixel pattern points in the longitudinal direction of the fiber rope 1 and/or in the transverse direction of the fiber rope from each other, cf. FIG. 4, and compare the same with a setpoint value that can be determined from the image of the fiber rope in the original condition or desired condition, and/or with a known course, in order to determine an elongation of the rope in longitudinal direction and/or transverse direction.

For example, when the rope 1, in particular its wear sheath 2, is provided with red or differently colored strands 3, which for example can be spirally incorporated in the sheath 2, these red fibers or strands in the image of the fiber rope 1 have a predetermined distance 1 from each other. When the rope experiences an excessive elongation due to aging and/or damage, this is reflected in a corresponding increase in distance Δl of the red stripes, by means of which the discard state or damage can be detected, cf. FIG. 4.

The detection device 12 for detecting the actual state of the high-strength fiber rope 1 can also include a sensor system 16 for sensorily detecting the actual state of the rope core 11 and/or the rope sheath 2, in order to be able to detect the actual state of the rope core 11 and/or of the rope sheath 2 in another way, possibly as an alternative or in addition to the optical detection of the state of the wear sheath 2. This sensor system 16 advantageously can comprise a load spectrum counter and/or determine several parameters of the rope core 11 and/or the rope sheath 2 in order to assume a damage in the case of predetermined changes of one or more rope core and/or rope sheath parameters.

As regards its determination of the discard state, the device advantageously adapts itself to the respectively used rope and its light absorption coefficients. For this purpose, said detection device 12 can include detection means for detecting the light absorption coefficient of the rope sheath, for example comprising contrast determination means, which compare a detected image of the rope sheath with a reference image in terms of the brightness of the rope sheath, and determine the brightness/darkness of the rope sheath.

With reference to the determined rope brightness/darkness an adaptation module of the determination device for example can change the critical number of load cycles, at which the load spectrum counter outputs the discard state signal.

We claim:

1. A device for determining a discard state of a high-strength fiber rope having a rope core comprising high-strength plastic fibers or strands and a rope sheath surrounding the rope core, comprising:
   an optical detector and/or a load spectrum counter, wherein a damage image of the rope sheath is detectable by the optical detector, wherein load cycles associated with the high-strength fiber rope are countable by the load spectrum counter;
   a detector, wherein a light absorption coefficient and/or a degree of reflection of the rope sheath is detectable by the detector; and
   an adaptor, wherein the discard state is determinable by an algorithm, wherein the algorithm is adaptable by the adapter based on a detected light absorption coefficient and/or a detected degree of reflection, wherein a critical number of load cycles at which a discard state signal is output is adjustable by the adaptor in dependence on the detected light absorption coefficient and/or the detected degree of reflection such that at a higher degree of light absorption the critical number of load cycles is set lower than at a comparatively lower light absorption coefficient.

2. The device of claim 1, wherein black and/or white pigments and/or other light absorption pigments with which fibers and/or fiber bundles of the rope sheath are colored are detectable by the detector, and/or wherein a quantity of the fibers and/or fiber bundles is determinable by the detector, and wherein the light absorption coefficient and/or the degree of reflection of the rope sheath is determinable by the detector with reference to detected black and/or white pigments and/or other light absorption pigments and/or with reference to a detected quantity of the fibers and/or fiber bundles.

3. The device of claim 1, wherein when a darker rope sheath is detected, the critical number of load cycles is decreasable by the adaptor, and wherein when a brighter rope sheath is detected, the critical number of load cycles is increasable by the adaptor.

4. The device of claim 1, wherein when the detector detects a light absorption coefficient of a >0.6 or a >0.75 for a heavy load spectrum in which the high-strength fiber rope has a service life of less than 50% of the maximum service life which the high-strength fiber rope has when subjected to a load spectrum leading into a range of the Wöhler fatigue strength, a critical number of load cycles is adjustable by the adaptor to less than 50% of the number of load cycles at which a fatigue strength range is reached, and wherein when the detector detects a light absorption coefficient of a <0.4 or a <0.3 for a lightweight load spectrum at which the high-strength fiber rope has a service life of at least 75% of the maximum service life, the critical number of load cycles is adjustable by the adaptor to 75% or more of the number of load cycles at which the fatigue strength range is reached.

5. A lifting gear comprising:
a high-strength fiber rope having a rope core comprising high-strength plastic fibers or strands and a rope sheath surrounding the rope core; and
the device for determining the discard state of a high-strength fiber rope of claim 1.

6. The lifting gear of claim 5, wherein the lifting gear comprises a crane, a tower crane, or a telescopic boom crane, and wherein at least one hoisting rope of the crane, the tower crane, or the telescopic boom crane on which a load lifter is mounted comprises the high-strength fiber rope.

7. The lifting gear of claim 6, wherein the load lifter comprises a load hook.

8. The lifting gear of claim 5, further comprising a high-strength fiber rope set comprising high-strength fiber ropes for various operating conditions of the lifting gear, wherein each of the high-strength fiber ropes has a rope core and a rope sheath wearable more quickly than the rope core, wherein the high-strength fiber ropes have the same rope diameters, the same rope core diameters, the same rope sheath thicknesses, the same fiber bundle arrangements, the same fiber materials and the same rope tensile strength, wherein the rope sheaths have different daylight absorption coefficients, wherein a first high-strength fiber rope of the high-strength fiber rope set configured for more wear-intensive operating conditions has a rope sheath with a higher daylight absorption coefficient than a second high-strength fiber rope of the high-strength fiber rope set configured for lower-wear operating conditions, and wherein a critical number of load cycles is adjustable by the adaptor based on the high-strength fiber rope from the high-strength fiber rope set used with the lifting gear and based on a detected daylight absorption coefficient.

9. The lifting gear of claim 5, wherein the lifting gear comprises a crane, a tower crane, or a telescopic boom crane.

10. A device for determining a discard state of a high-strength fiber rope having a rope core comprising high-strength plastic fibers or strands and a rope sheath surrounding the rope core, comprising:
an optical detector and/or a load spectrum counter, wherein a damage image of the rope sheath is detectable by the optical detector, wherein load cycles associated with the high-strength fiber rope are countable by the load spectrum counter;
a detector, wherein a light absorption coefficient and/or a degree of reflection of the rope sheath is detectable by the detector; and
an adaptor, wherein the discard state is determinable by an algorithm, wherein the algorithm is adaptable by the adapter based on a detected light absorption coefficient and/or the detected degree of reflection, wherein when a darker rope sheath is detected, a critical number of load cycles is decreasable by the adaptor, and wherein when a brighter rope sheath is detected, the critical number of load cycles is increasable by the adaptor.

11. A device for determining a discard state of a high-strength fiber rope having a rope core comprising high-strength plastic fibers or strands and a rope sheath surrounding the rope core, comprising:
an optical detector and/or a load spectrum counter, wherein a damage image of the rope sheath is detectable by the optical detector, wherein load cycles associated with the high-strength fiber rope are countable by the load spectrum counter;
an adaptor, wherein the discard state is determinable by an algorithm, and wherein the algorithm is adaptable by the adapter based on a detected light absorption coefficient and/or a detected degree of reflection; and
a detector, wherein the light absorption coefficient and/or the degree of reflection of the rope sheath is detectable by the detector, wherein when the detector detects a light absorption coefficient of a >0.6 or a >0.75 for a heavy load spectrum in which the high-strength fiber rope has a service life of less than 50% of the maximum service life which the high-strength fiber rope has when subjected to a load spectrum leading into a range of the Wöhler fatigue strength, a critical number of load cycles is adjustable by the adaptor to less than 50% of the number of load cycles at which a fatigue strength range is reached, and wherein when the detector detects a light absorption coefficient of a <0.4 or a <0.3 for a lightweight load spectrum at which the high-strength fiber rope has a service life of at least 75% of the maximum service life, the critical number of load cycles is adjustable by the adaptor to 75% or more of the number of load cycles at which the fatigue strength range is reached.

\* \* \* \* \*